United States Patent
Kleve et al.

(10) Patent No.: US 11,210,929 B2
(45) Date of Patent: *Dec. 28, 2021

(54) HOME SMART LISTENING DEVICES LINKING TO MULTIPLE TRANSPORT VEHICLES

(71) Applicant: FORD GLOBAL TECHNOLOGIES, LLC, Dearborn, MI (US)

(72) Inventors: Robert B. Kleve, Ann Arbor, MI (US); Eric L. Reed, Livonia, MI (US); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,601

(22) Filed: Nov. 2, 2020

(65) Prior Publication Data

US 2021/0049896 A1    Feb. 18, 2021

Related U.S. Application Data

(63) Continuation-in-part of application No. 16/240,967, filed on Jan. 7, 2019, now Pat. No. 10,825,332.

(51) Int. Cl.
*G08B 27/00*    (2006.01)
*H04W 4/44*    (2018.01)
(Continued)

(52) U.S. Cl.
CPC ............. *G08B 27/005* (2013.01); *G08B 1/08* (2013.01); *G08B 25/003* (2013.01);
(Continued)

(58) Field of Classification Search
None
See application file for complete search history.

(56) References Cited

U.S. PATENT DOCUMENTS 7,477,144 B2    1/2009  Albert
8,594,616 B2    11/2013 Gusikhin et al.
(Continued)

FOREIGN PATENT DOCUMENTS

JP    2002236985 A    8/2002
WO    2005106815 A1   11/2005
WO    2013178869 A1   12/2013

OTHER PUBLICATIONS

Alexa is Now Even Smarter—New Features Help Make Everyday Life More Convenient, Safe, and Entertaining, Press Release, Seattle—Business Wire, Sep. 20, 2018, pp. 1-5.
(Continued)

*Primary Examiner* — John F Mortell
(74) *Attorney, Agent, or Firm* — Frank L. Lollo; MacMillan, Sobanski & Todd, LLC

(57) ABSTRACT

Crowd-sourcing of vehicles and smart listening devices is used for neighborhood monitoring. A cluster server is configured within a public network to maintain a cluster directory identifying cluster members including a neighborhood of smart listening devices and user vehicles, wherein the neighborhood is associated with a cluster of dwellings. The surroundings of the smart listening devices and the user vehicles are monitored using sensors in the smart listening devices and the user vehicles. Upon detecting an alerting event with one of the sensors, a corresponding one of the smart listening devices and the user vehicles that detected the alerting event initiates a message to another cluster member based on the cluster directory. The cluster member receiving the message initiates its own responsive action to the alerting event.

13 Claims, 9 Drawing Sheets

(51) Int. Cl.
  *G08B 25/01* (2006.01)
  *G08B 25/00* (2006.01)
  *G08B 1/08* (2006.01)

(52) U.S. Cl.
  CPC ......... *G08B 25/012* (2013.01); *G08B 27/003* (2013.01); *H04W 4/44* (2018.02)

(56) References Cited

U.S. PATENT DOCUMENTS

| | | |
|---|---|---|
| 9,142,118 B2 | 9/2015 | Patenaude et al. |
| 10,079,021 B1 | 9/2018 | Barra Chicote et al. |
| 2013/0088352 A1 | 4/2013 | Amis |
| 2013/0141228 A1* | 6/2013 | Nagda .................... G08G 1/205 340/439 |
| 2018/0048850 A1* | 2/2018 | Bostick .................. H04N 7/188 |
| 2018/0234843 A1 | 8/2018 | Smyth et al. |
| 2019/0304213 A1* | 10/2019 | Chen .................... G07C 5/0808 |

OTHER PUBLICATIONS

Home Security Made Easy, Transparent and Affordable, Point Security System & Smart Alarm, pp. 1-6, Aug. 31, 2018.
Leeo Smart Alert | Peace of Mind with Simple Alarm Monitoring, Leeo, Inc. 2018, https://www.leeo.com/product.

* cited by examiner

HOME SMART LISTENING DEVICES LINKING TO MULTIPLE TRANSPORT VEHICLES

CROSS REFERENCE TO RELATED APPLICATIONS

This application is a continuation-in-part of co-pending U.S. application Ser. No. 16/240,967, filed Jan. 7, 2019, entitled "Home Smart Listening Device Linking To Transport Vehicle," which is incorporated herein by reference.

STATEMENT REGARDING FEDERALLY SPONSORED RESEARCH

Not Applicable.

BACKGROUND OF THE INVENTION

The present invention relates in general to home and vehicle security and safety, and, more specifically, to one or more home automation/smart assistants interfacing with one or more transport vehicles when monitored events occur.

As the Internet of Things (IoT) continues to expand, more and more devices are connected to the internet including smart smoke alarms, house security alarms, carbon monoxide (CO) detectors, doorbells, sump pump/flood alarms, and others. This usually requires older alarm units in the home to be exchanged for a smart version of the device that has some communication capability either directly to the internet or to another device that is connected to the internet, in order to alert the homeowner or authorities that the alarm device has triggered. These smart alarm devices are normally increased in cost compared to the unconnected or non-smart version they are replacing. The investment by a homeowner or business owner for these new devices can be a significant cost.

Many dwellings, offices, and other fixed locations may now have a smart listening device (SLD) installed which functions as a "virtual assistant" in the form of a voice-controlled wireless speaker with an electronic interface to a cloud service and local peripherals. Example devices include the Amazon Echo and the Sonos One (both of which use Amazon's Alexa Voice Service) and Google Home (which uses Google Assistant). These devices are being used to connect to a proliferation of smart home devices including Wi-Fi enabled smart alarm devices. While the smart alarm devices may usually communicate remotely with a user or an emergency services provider when a monitored event (e.g., smoke, carbon monoxide, or an intruder) is detected, an interface with the SLD can centralize and coordinate responses while increasing the detection and response capabilities.

The listening capabilities of an SLD can also enable a centralized/coordinated response to alarm devices which lack Wi-Fi or other remote capabilities. For example, an SLD can be trained to recognize the alarm sounds produced by non-networked alarm devices such as smoke alarms and to perform a desired notification or other response when the alarm sounds are detected. For training, a user can initiate an SLD programming mode via a button press or a voice command. With the SLD listening, the user manually triggers an alarm device (e.g., a doorbell or a smoke/carbon monoxide alarm) to emit its normal alerting sound. The SLD stores acoustical signatures in memory according to "tags" or label names as provided by the user. Any events with a sufficiently distinct acoustic signature could be recorded, labeled, and assigned to a responsive action. Example event triggers include security alarms, smoke detector, doorbell, CO alarm, knocking on an exterior door, a baby crying, sump pump shutoff or flood/high water audible alarms, unauthorized entry or attempted entry, garage door or entrance door opening, glass breaking, dog barking, floor squeaks, unrecognized voice (based on prior voice training), sound of running water (e.g., broken pipe), or running appliances (e.g., microwave, dishwasher, clothes washer, or dryer). Multiple SLDs in the home may be used in coordination to identify the location of the sound within the home through various triangulation techniques.

During a monitoring mode, the SLD can continuously listen for sounds and compare collected audio samples against the signatures stored in memory. The monitoring mode may be initiated by the user through voice commands, by setting a schedule, or by conditions (such as lack of sound for a period of time) that indicate that the user is not home, for example. Once a particular match is detected with a stored signature, a corresponding alerting action or other response can be taken automatically. These can include a notification sent to the user or other contacts as identified in advance using a contact method also configured in advance (e.g., a network push notification). Other actions can include using the SLD to generate a sound (e.g., a barking dog) or activating Wi-Fi-enabled lights to frighten away a possible intruder.

SUMMARY OF THE INVENTION

The invention extends the alert/response capabilities of an SLD in novel ways which are cost efficient and provide significant improvements in safety and convenience. More specifically, monitoring and security features may be "crowdsourced" using cooperation among a local cluster of SLDs and/or vehicles to more effectively detect and respond to undesirable activity or events in an area (e.g., a neighborhood).

In one aspect of the invention, a smart listening device comprises an audio detector responsive to speech and ambient sounds to provide digital audio signals. A distributed controller is coupled to the audio detector to execute responsive actions in response to the digital audio signals. A communications circuit establishes a first communication link with a cloud backend. A vehicle database identifies at least one user transport vehicle and at least one responsive action corresponding to the user vehicle. The distributed controller has a monitoring mode for detecting preconfigured alerting events and has an alert/response mode for executing responsive actions associated with the detected alerting events. The communications circuit establishes a second communication link with the user vehicle when an executed responsive action is associated with a detected alerting event corresponding to the user vehicle in order to initiate the responsive action.

In another aspect of the invention, crowd-sourcing of vehicles and smart listening devices is used for neighborhood monitoring. A cluster server is configured within a public network to maintain a cluster directory identifying cluster members including a neighborhood of smart listening devices and user vehicles, wherein the neighborhood is associated with a cluster of dwellings. The surroundings of the smart listening devices and the user vehicles are monitored using sensors in the smart listening devices and the user vehicles. Upon detecting an alerting event with one of the sensors, a corresponding one of the smart listening devices and the user vehicles that detected the alerting event initiates a message to another cluster member based on the cluster directory. The cluster member receiving the message initiates its own responsive action to the alerting event.

DETAILED DESCRIPTION OF PREFERRED EMBODIMENTS

Voice-controlled smart assistant systems which communicate with a backend system in order to deliver relevant information via synthesized voice signals or prerecorded media content and to initiate other actions such as controlling peripheral electronic devices are becoming increasingly popular. In some embodiments, a wakeword or activation sound is detected by the smart listening device, which then interprets/analyzes the incoming audio. In regard to speech control, a device constantly listens for a wakeword but is otherwise inactive. For alarm detection, a recognized audio signature may be acted upon without recognition of the wakeword.

Figure 1:
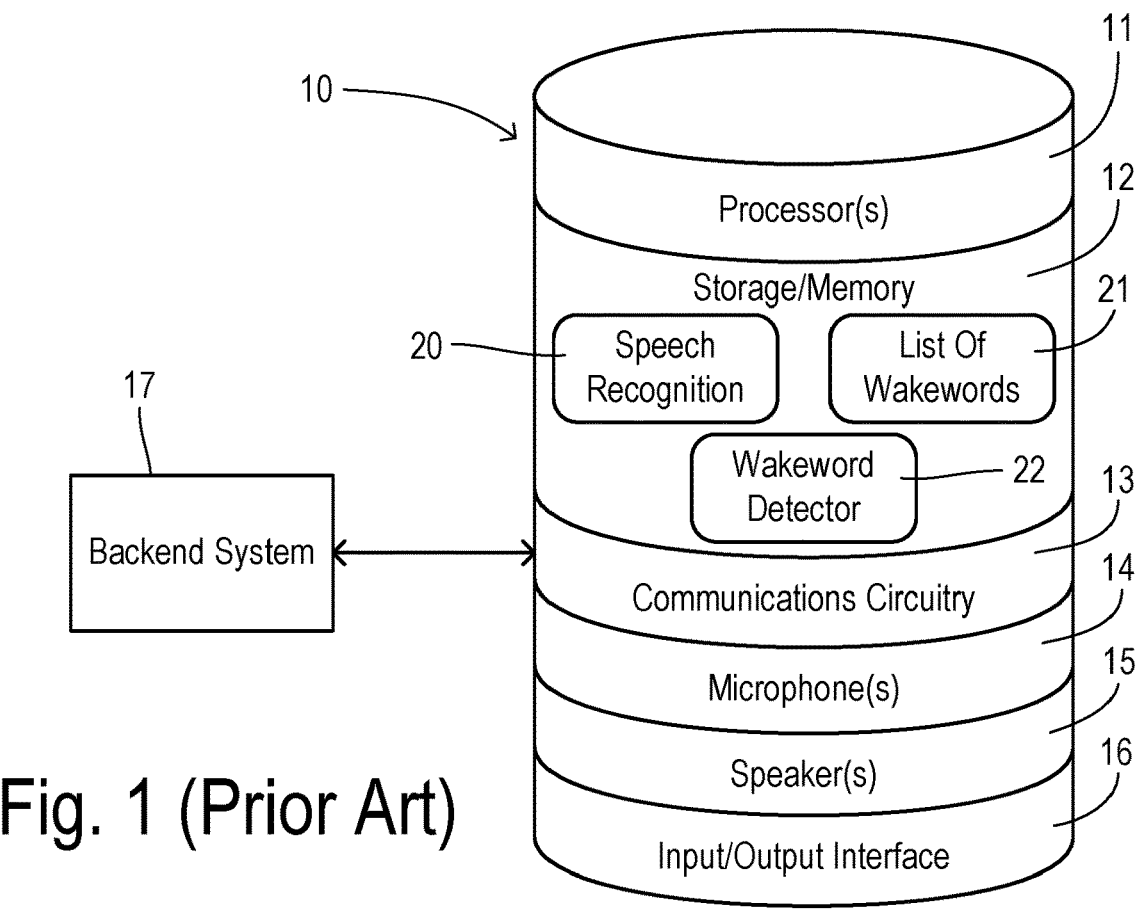
FIG. 1 is a block diagram showing a conventional smart listening device.

In FIG. 1, a voice-activated smart listening device (SLD) 10 includes processors or processing circuits 11, a memory/storage unit 12, communications circuitry 13, microphone(s) 14, loudspeaker(s) 15, and input/output interface 16. Communication circuitry 13 may include a wireless network interface controller for providing a Wi-Fi connection to a wireless router or other network access device that provides communication via the Internet to a backend system 17 (i.e., a cloud system). Communication circuitry 13 can alternatively or additionally include other wireless data platforms such as cellular telephone, Bluetooth®, or infra-red data channels to communicate with backend 17 or with peripheral devices and accessories. Input/output interface 16 may optionally include a power on/off switch, indicator lights, input buttons or keyboard, a graphical display, and/or a touchscreen.

Processors 11 and memory 12 are configured to control operations and functionality of SLD 10, including such functions as speech recognition 20 and wakeword detection 22 based on a list of stored wakewords 21 or sound profiles.

As known in the art, speech recognition module 20 may include automatic speech recognition (ASR) and natural language understanding (NLU) converting spoken words into appropriate text using the detected audio. In a distributed control approach, the converted text may be sent to backend system 17 for processing. The digital audio data (e.g., MP3 data) containing speech or other sounds picked up by microphone(s) 14 may be streamed to backend system 17 so that analysis can begin on a user's request for information. Thus, backend system 17 can start analyzing whatever portion of the digital audio data is received in order to interpret the meaning of a user request and to eventually define an appropriate query. Then backend system 17 retrieves responsive information or actions which are communicated back to SLD 10. Speech recognition module 20 may also have a text-to-speech (TTS) component for converting text included within a response into speech sounds to be outputted by speaker(s) 15.

Figure 2:
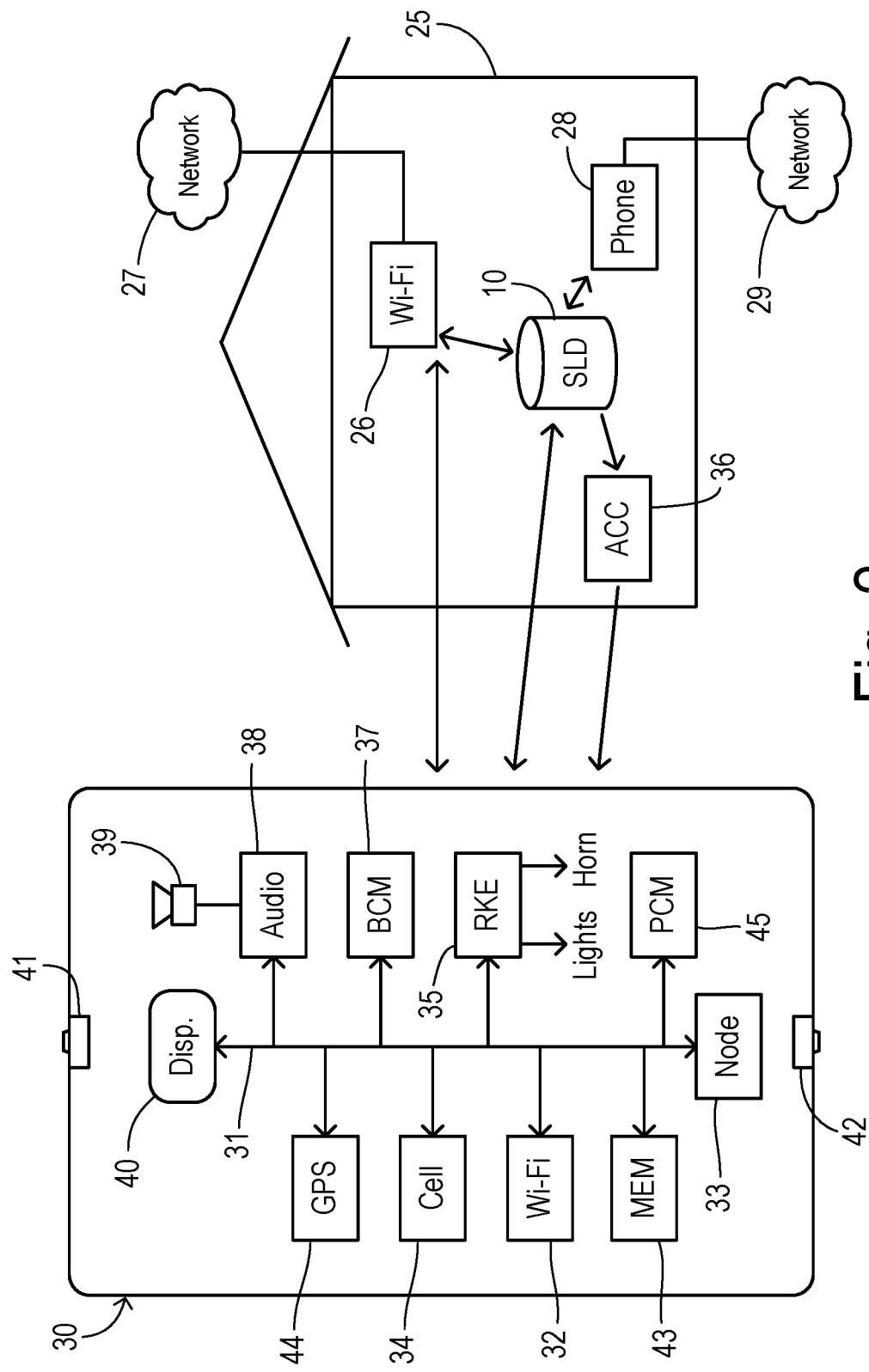
FIG. 2 is a block diagram showing interaction between an SLD and a transport vehicle for performing alerting/response actions.

FIG. 2 shows a typical scenario for deploying the present invention wherein an SLD 10 is used at a fixed location within a dwelling 25, such as a home or office. A Wi-Fi router 26 communicates with SLD 10 for establishing a first communication link to a cloud network 27. SLD 10 may include additional network interfaces, such as a cellular or land line phone instrument 28 to transmit data to and receive data via another network 29.

In the present invention, SLD 10 achieves expanded functionality and capabilities by interacting with a transport vehicle 30. Vehicle 30 may be a car, SUV, or truck of the same individuals who are residing in dwelling 25, for example. Vehicle 30 has an electrical system wherein various modules interact via a communication bus 31. By accessing devices on bus 31, the invention can obtain access to a wide variety of features and functions of vehicle 30 that may be useful in implementing actions and responses under control of SLD 10 in response to various preprogrammed events or alerts.

Vehicle 30 may preferably include a Wi-Fi module 32 connected with bus 31 via a gateway (not shown) in order to establish a second communication link via Wi-Fi between SLD 10 and vehicle 30 (e.g., through Wi-Fi router 26). Vehicle 30 may also include a Bluetooth node 33 and a cellular transceiver 34 which could also support a communication link with SLD 10, depending upon the distance between vehicle 30 and SLD 10. Via the established communication link, many useful actions or responses become available in connection with various triggering events detected at SLD 10 as described below.

Vehicle 30 may typically include a remote keyless entry/security system (RKE) module 35 which receives RF signals from a remote key fob to control vehicle access and which can generate panic alarms and intrusion alarms by flashing vehicle lights and honking a vehicle horn, for example. When a monitored event is detected within dwelling 25 (whether directly detected by SLD 10 or by another smart device in communication with SLD 10) the affected area over which an alarm might be heard or noticed can be significantly increased by utilizing RKE system 35 of vehicle 30 to generate additional warning signs and sounds. As a result of conducting the necessary set-up within vehicle 30 and SLD 10 to allow a communication link and proper authentication between them (e.g., via Wi-Fi router 26 or Bluetooth node 33), SLD 10 can execute a responsive action comprising the triggering of audible and visible vehicle alarms when SLD 10 detects a preconfigured alerting event that has been set-up to include that action.

SLD 10 may be interconnected with various accessories 36 which may include various smart sensors or smart alarm systems for detecting various conditions such as smoke or carbon monoxide and which may generate their own warnings or may interact with SLD 10 to generate alerts and other responses. Accessories 36 may also include additional wireless interfaces configured to interact with RF controlled systems in the vehicle such as RKE system 35. In other words, a transmitter of the type used in a vehicle key (e.g., in a key fob or Phone-as-a-Key) can be incorporated into an accessory unit 36 or built into SLD 10 which sends the normal RF command signals used by vehicle 30 (e.g., by issuing a panic alarm command to RKE module 35). In addition, accessories 36 may be used to recognize and relay an alarm condition occurring in the vehicle to the SLD to further extend the usefulness of the SLD to respond to vehicle conditions in situations where the audible recognition of the vehicle alarm is impaired.

Responsive actions executed by vehicle 30 can take many other forms by interacting with other vehicle systems such as a body control module (BCM) 37, an audio system 38 and loudspeaker 39, or a graphical display 40. For example, BCM 37 (or another module) can trigger an automatic cellular telephone call via cellular transceiver 34 to a remote assistance center or an emergency response provider. An automatic telephone call by the vehicle can be initiated in conjunction either with an audible alarm (generated by SLD 10 and/or vehicle 30) or without an audible alarm (e.g., a silent alarm that may have been generated by SLD 10 upon recognition of a "not safe" word spoken by a person facing an emergency in the dwelling, such as a home invasion). In another embodiment, the responsive action is comprised of notifying a user that an alerting event has been detected (e.g., by displaying a message on display 40 and/or synthesizing a voice message via audio system 38). As part of a notification, a two-way communication channel (e.g., an audio intercom) can be initiated between vehicle 30 and SLD 10 utilizing the communication link, thereby allowing the user in vehicle 30 to monitor an ongoing situation being detected by SLD 10 within dwelling 25.

In another embodiment, the vehicle 30 can be used as a device for collecting evidence when it is parked nearby dwelling 35 where a monitored event has been detected. For example, vehicle 30 includes forward and rearward cameras 41 and 42 which can be triggered to collect video signals to be recorded in a memory 43 which might capture events transpiring near dwelling 25 during a time of potential emergency. The recorded video could be later accessed in event reconstruction. The recording function may interact with a navigational GPS system 44 in order to tag recorded data with a geographic location and a time of day.

Vehicle 30 can also fulfill the role of a remote sensor (e.g., environmental sensor) to assist SLD 10 in evaluating various conditions being monitored. For example, a powertrain control module (PCM) 45 could be accessed in order to provide temperature data or humidity data used by SLD 10 to recognize alert conditions or select the best response to detected events. Other vehicle modules could also provide access to other important conditions, such as a body control module providing a vehicle security alarm trigger.

Figure 3:
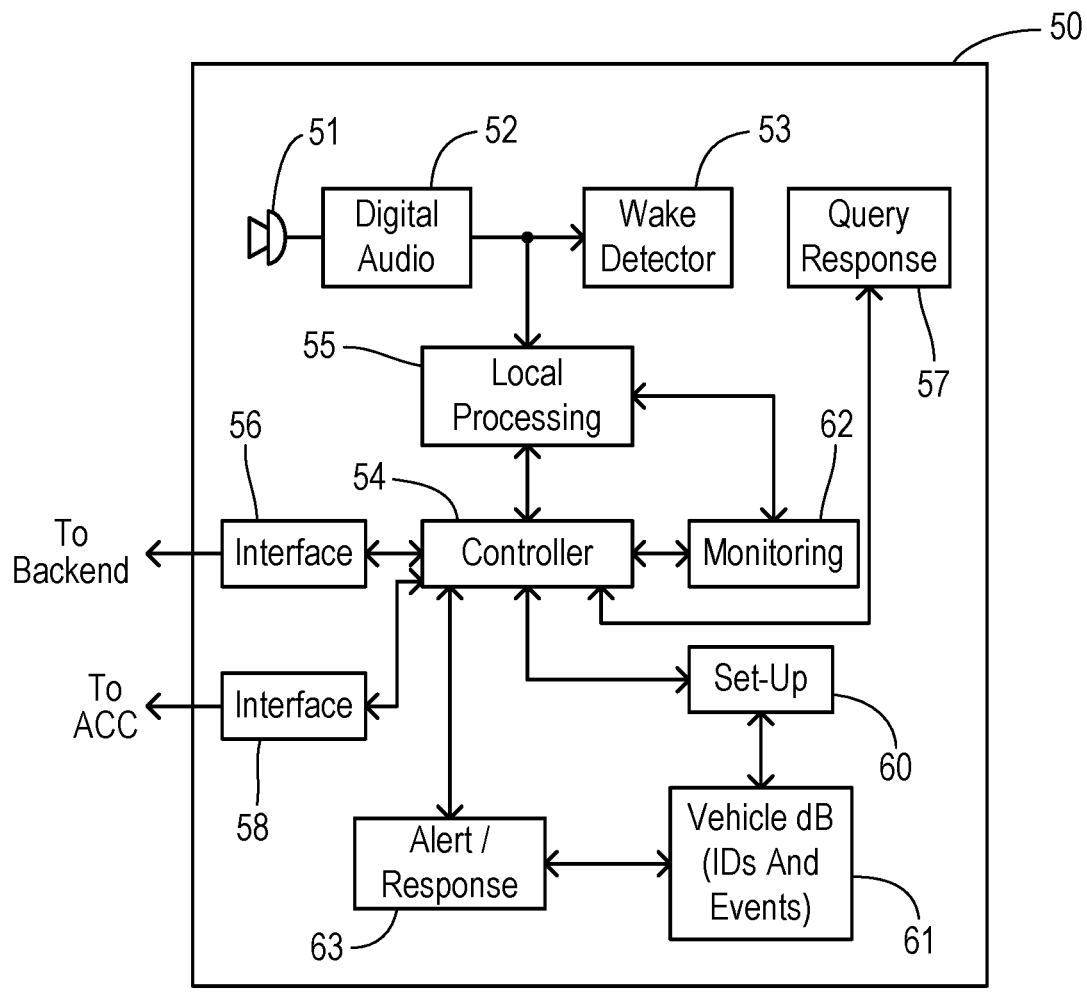
FIG. 3 is a block diagram showing an SLD configured for added features of the present invention.

FIG. 3 shows a modified SLD 50 adapted for implementing an alert system of the present invention. A microphone 51 receives spoken and ambient sounds which are converted to digital audio signals in a converter 52. The digital audio signals are monitored by a wake detector 53 for performing conventional voice interaction. The digital audio signals are also coupled to a local processing circuit 55 and a controller 54 in order to monitor for acoustic signatures stored in memory that are associated with monitored events such as audible alarms from smoke detectors, sounds of glass breakage, doorbell sounds, and others. Controller 54 is a distributed controller which is connected to an interface 56 for accessing a backend system as necessary for analyzing spoken requests as well as detecting acoustic signatures of monitored events and/or determining responsive actions to take for detected events. Controller 54 is connected to a query response block 57 which may include a speaker and other devices for providing spoken outputs or other responsive actions to the spoken commands from the user. Controller 54 is also connected to an interface 58 for interacting with various accessory devices including smart sensors interacting with SLD 50 via Wi-Fi.

In connection with the ability of the invention to execute responsive actions associated with a transport vehicle, SLD 50 includes a set-up mode or block 60 used to configure a vehicle database 61 for storing identifying information and event parameters that are used in executing vehicle responsive actions. A user accesses set-up mode 60 to configure database 61 with link data for establishing communication links to one or more vehicles and to configure database 61 with feature data for each vehicle which enables various vehicle interactions supporting the responsive actions desired by the user. For example, protocols would be established for accessing and authenticating various system functions within the vehicle such as turning on or off a panic alarm, activating camera recording for a particular length of time, or activating the streaming one-way or two-way communication signals. The vehicle feature data may include identification of available features and selectable parameter settings that may be available such as camera views to be recorded, etc.

SLD 50 includes a monitoring block 62 which continuously listens for preconfigured acoustic signatures and waits for alarm notifications from associated smart sensors. When a monitored event is detected, then an alert response mode 63 is accessed by controller 54 for generating the preconfigured responsive actions.

Figure 4:
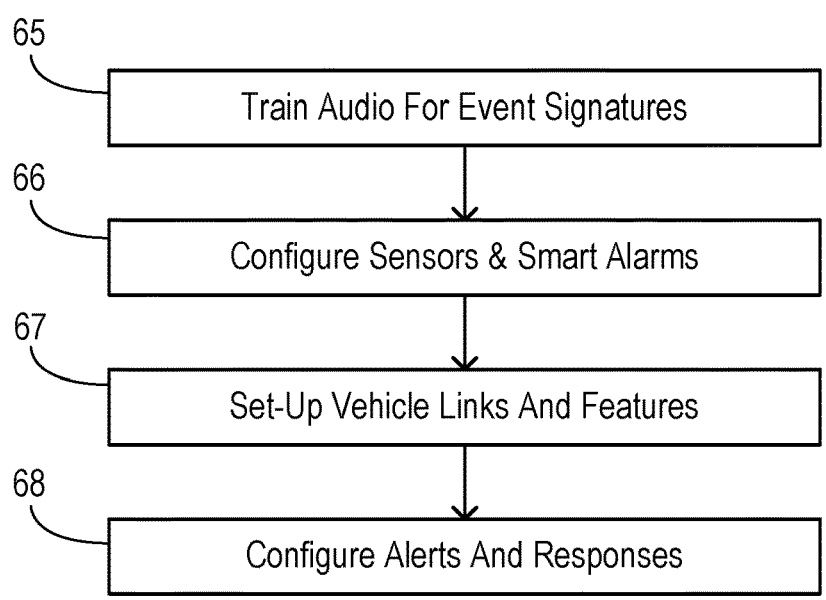
FIG. 4 is a flowchart showing one preferred method of the invention.

FIG. 4 shows a flowchart for the set-up mode. In step 65, the SLD is trained based on the sounds corresponding to selected "alerting events" which create a recognizable and consistent acoustic signature. The training comprises recording of training sounds into a stored signature which may be tagged with metadata identifying the event and specifying some responsive actions. In step 66, the SLD is optionally configured to work with smart sensors and/or smart alarm systems to coordinate responses and to expand the capabilities for monitoring the full circumstances surrounding any alerting events.

In step 67, one or more vehicle links and vehicle feature data are set-up by the user. The communication links may be specified according to the available communication channels (e.g., Wi-Fi network, RF transmitter frequency, Bluetooth pairing, etc.), address information, and authentication credentials, for example. In step 68, responsive actions and alerts are configured for each potential alerting event associated with an identified vehicle so that they can be stored in the vehicle database within the SLD.

Figure 5:
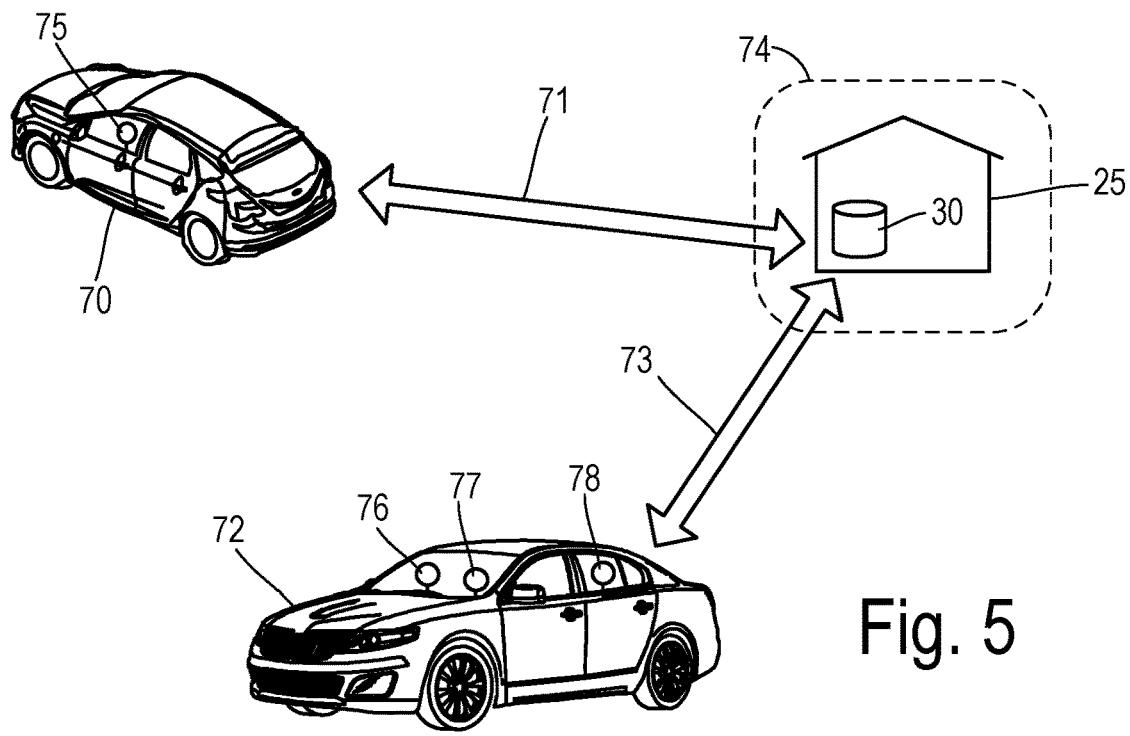
FIG. 5 is a diagram illustrating the tracking of registered vehicle and home occupants for automatic activation and deactivation of a monitoring mode.

The registration of individual vehicles within database 61 can also be used in connection with activating and deactivating the monitoring mode. This feature can also benefit from an expansion of the database to include registration of the identities (and communication links) of persons who are authorized occupants of the home. As shown in FIG. 5, the proximity of vehicles and home occupants can be assessed to detect times when the home is unoccupied. Vehicles 70 and 72 are associated with dwelling 25 and the typical occupants (e.g., residents) who are normally there. Vehicles 70 and 72 have communication links 71 and 73 with SLD 30 in dwelling 25. A proximity zone 74 is established around dwelling 25 covering an area where a vehicle or person would be considered to be "at home" or present at dwelling 25.

A person 75 occupies vehicle 70, and persons 76, 77, and 78 occupy vehicle 72. Vehicles 70 and 72 and people 75-78 and associated communication links are previously registered within a database in SLD 30. When all of people 75-78 are outside of zone 74, then SLD 30 can infer that dwelling 25 is unoccupied, and the absence of vehicles 70 and 72 from dwelling 25 can be helpful in determining the absence of the persons occupying them. For example, vehicles 70 and/or 72 can report their geographic coordinates to SLD 30 which then detects that vehicles 70 and/or 72 are outside zone 74. Each vehicle may identify its occupants (e.g., through various means of in-vehicle identification, such as phone pairing, voice-matching, facial recognition, or other biometric identification) and report this information to SLD 30. If all people who were previously registered to SLD 30 (e.g., all authorized occupants of a home) are found to be occupying a vehicle outside zone 74, then SLD 30 detects that dwelling 25 is now empty and it initiates the monitoring mode automatically. Similarly, SLD 30 automatically turns off the monitoring mode upon the return of a registered person and/or registered vehicle.

Knowledge of the locations of the registered vehicles and authorized residents of the dwelling is also useful for responsive actions during the alert/response mode. For example, when an alarm is triggered then the SLD can select the closest vehicle for sending a notification to a user.

Figure 6:
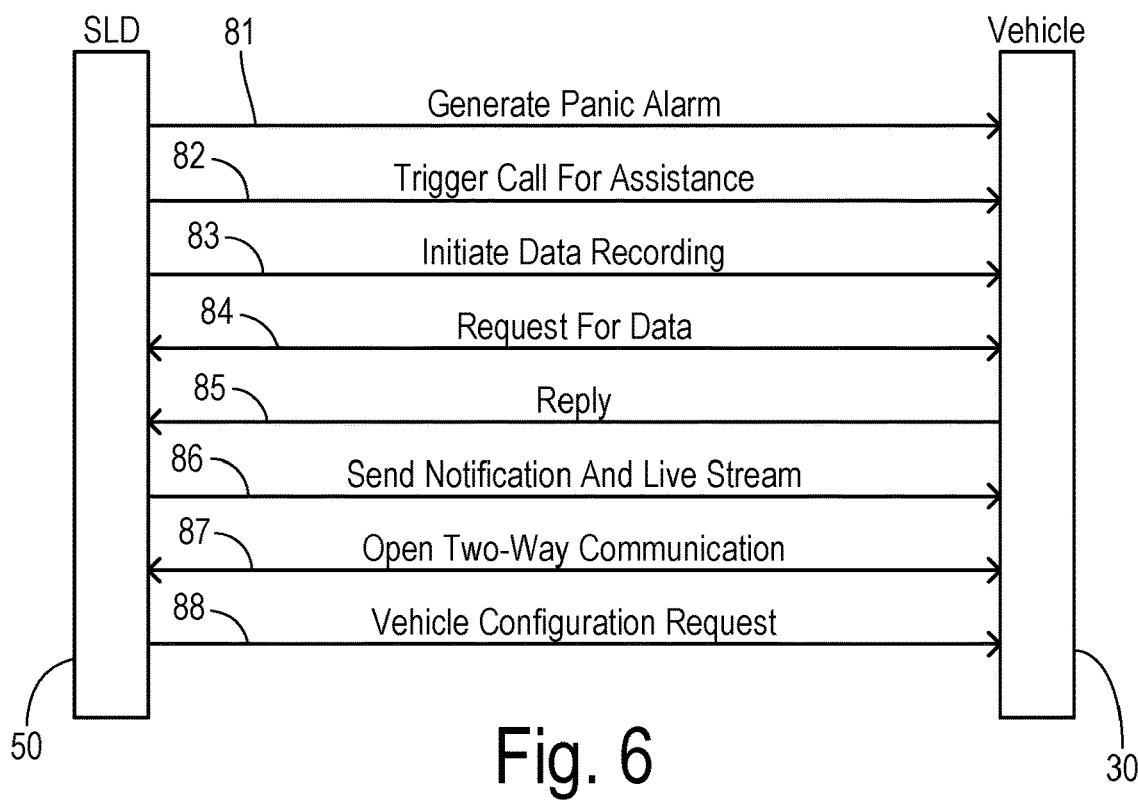
FIG. 6 is a diagram showing communication events between an SLD and a transport vehicle according to various embodiments of the invention.

FIG. 6 illustrates several embodiments of exchanges between SLD 50 and vehicle 30 over the communication link according to responsive actions/alerts executed in the respective embodiments. In one embodiment, a transaction 81 is comprised of signaling from SLD 50 to vehicle 30 which activates the panic alarm of vehicle 30. For instance, in response to the detection of an intruder or the detection of smoke or carbon monoxide, SLD 50 causes the vehicle panic alarm to generate an alerting sound that may be very perceptible not only in the dwelling where SLD 50 is located but also to adjoining areas and dwellings.

A transaction 82 is comprised of SLD 50 requesting that vehicle 30 activate a cellular phone-based emergency response system. Many vehicles are equipped with systems which automatically dial an emergency responder in the event of a vehicle crash. By triggering this feature in response to emergencies detected within the dwelling, valuable time can be saved in the arrival of emergency services.

A transaction 83 is comprised of a request from SLD 50 to vehicle 30 to initiate data recording for evidentiary purposes and event reconstruction. Data can include recorded video streams from vehicle-mounted cameras as well as audio recordings or the recording of vehicle environmental data.

In a transaction 84, SLD 50 may request various kinds of data from vehicle 30. During the monitoring mode, SLD 50 may request environmental data (e.g., captured video, audio, temperature, humidity, or other vehicle sensor data) useful in detecting and classifying monitored events. During the alerting/response mode, SLD 50 may request confirmation of the triggering of responses, for example. In a transaction 85, vehicle 30 provides replies to SLD 50 containing the requested data.

In a transaction 86, SLD 50 sends an alerting message to an occupant of vehicle 30 by way of a displayed text or synthesized speech. In addition, SLD 50 may live-stream audio and/or video signals to vehicle 30 to permit the occupant to more closely monitor activity in the dwelling. In a transaction 87, a responsive action may further include opening a two-way communication channel so that the vehicle occupant can communicate with a person in the dwelling.

In a transaction 88, SLD 50 may request vehicle configuration data from vehicle 30. In particular, such a request may occur during set-up mode so that a user can determine what response actions may be available. Thus, with little or no added expense, the functionality of an SLD-based monitoring/alerting system can be significantly enriched using capabilities of a user's transport vehicle which may or may not be located near the dwelling.

Additionally, a network of neighboring dwellings all having SLDs with similar capabilities may be used to recognize a vehicle intrusion alarm of a neighbor since one particular user's vehicle may be parked closer to a different neighbor's SLD instead of their own. Thus, an entire neighborhood network can provide a joint monitoring solution. More generally, a neighborhood cluster of SLDs and vehicles associated with a group of nearby dwellings can work cooperatively via either direct peer-to-peer interactions or as an interconnected network including a central, backend server that sets-up and manages the interactions.

Figure 7:
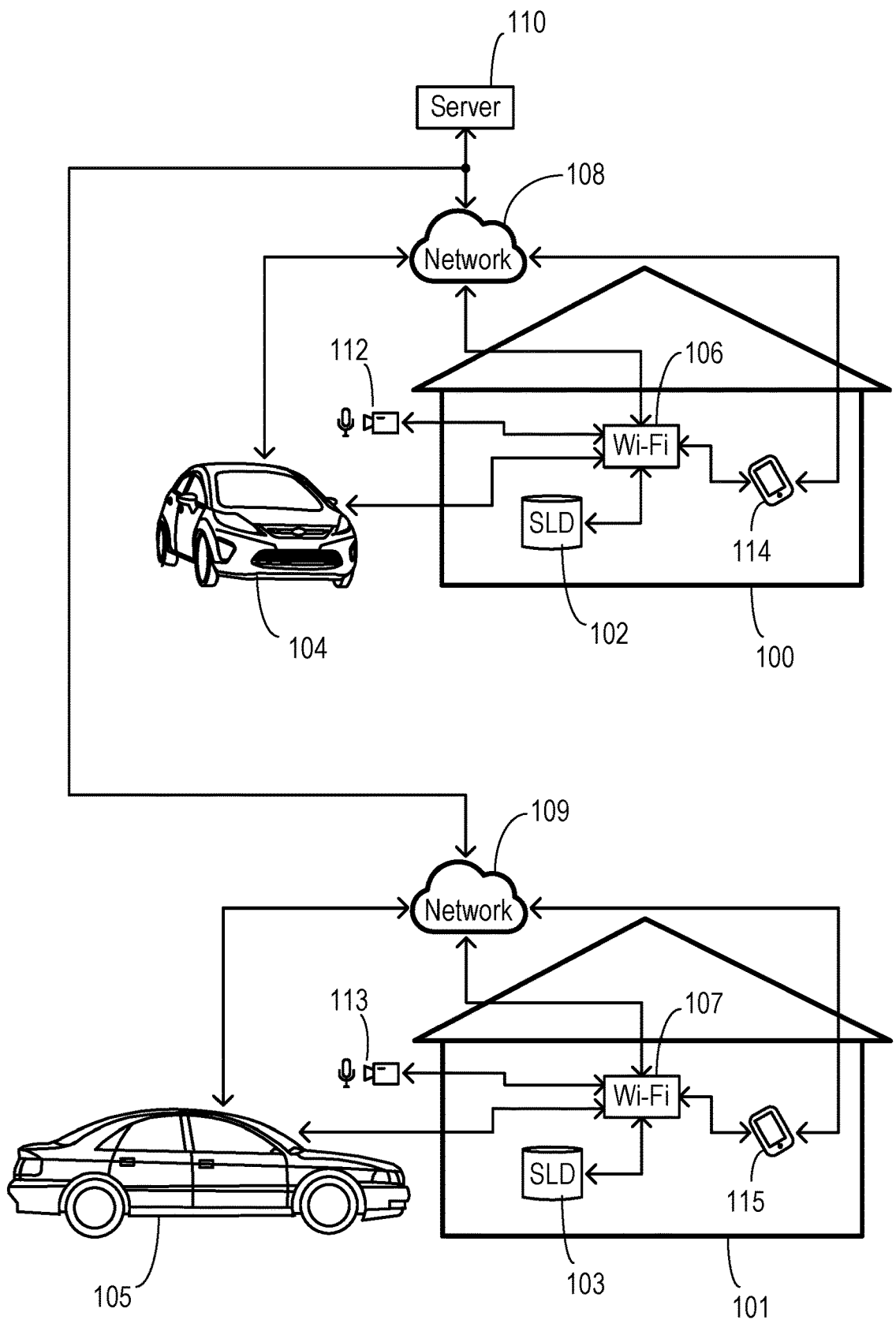
FIG. 7 is a block diagram showing a neighborhood cluster managed by a cloud server.

FIG. 7 shows an example cluster including dwellings 100 and 101 with SLDs 102 and 103, respectively. A vehicle 104 is associated with dwelling 100, and vehicle 105 is associated with dwelling 101. In each case, the vehicle may belong to an occupant/owner of the associated dwelling, for example. Dwelling 100 has a Wi-Fi access point (e.g., wireless router) 106 in wireless communication with SLD 102, a Wi-Fi node in vehicle 104, a fixed video/audio surveillance unit 112, and a mobile device 114 (e.g. cellphone). Router 106 is connected to a wide area network (WAN) 108 which is connected as part of the Internet or cloud. Vehicle 104 and mobile device 114 may also have a direct network connection into WAN 108 or other network with an interface to the Internet. WAN 108 is further connected to a server 110 which may be used for setup and operation of a cluster.

Dwelling 101 has a Wi-Fi access point (e.g., wireless router) 107 in wireless communication with SLD 103, a Wi-Fi node in vehicle 105, a fixed video/audio surveillance unit 113, and a mobile device 115. Router 107 is connected to a wide area network (WAN) 109 which is connected as part of the Internet or cloud. Vehicle 105 and mobile device 115 may also have a network connection into WAN 109 or another accessible network with an interface to the Internet. WAN 109 is further connected to server 110.

In addition to the network connectivity shown in FIG. 7, it is also possible to permit a vehicle associated with one dwelling to have a Wi-Fi connection to a Wi-Fi router in a different dwelling. This would enable an SLD of one dwelling to more directly communicate with a vehicle associated with another dwelling. If not configured in that way, communication between every SLD in a cluster with every vehicle in the same cluster can still available through server 110 if the users participating in the cluster wish it.

The interoperation of the SLDs and vehicles in a cluster enables crowd sharing of the capabilities of each SLD and vehicle with other members of a cluster. For example, a user could configure their vehicle to be shared as a sensor (for collecting environmental data and sharing it with other cluster members) or as a warning device (to generate an alarm based on trigger events detected by other cluster members).

Figure 8:
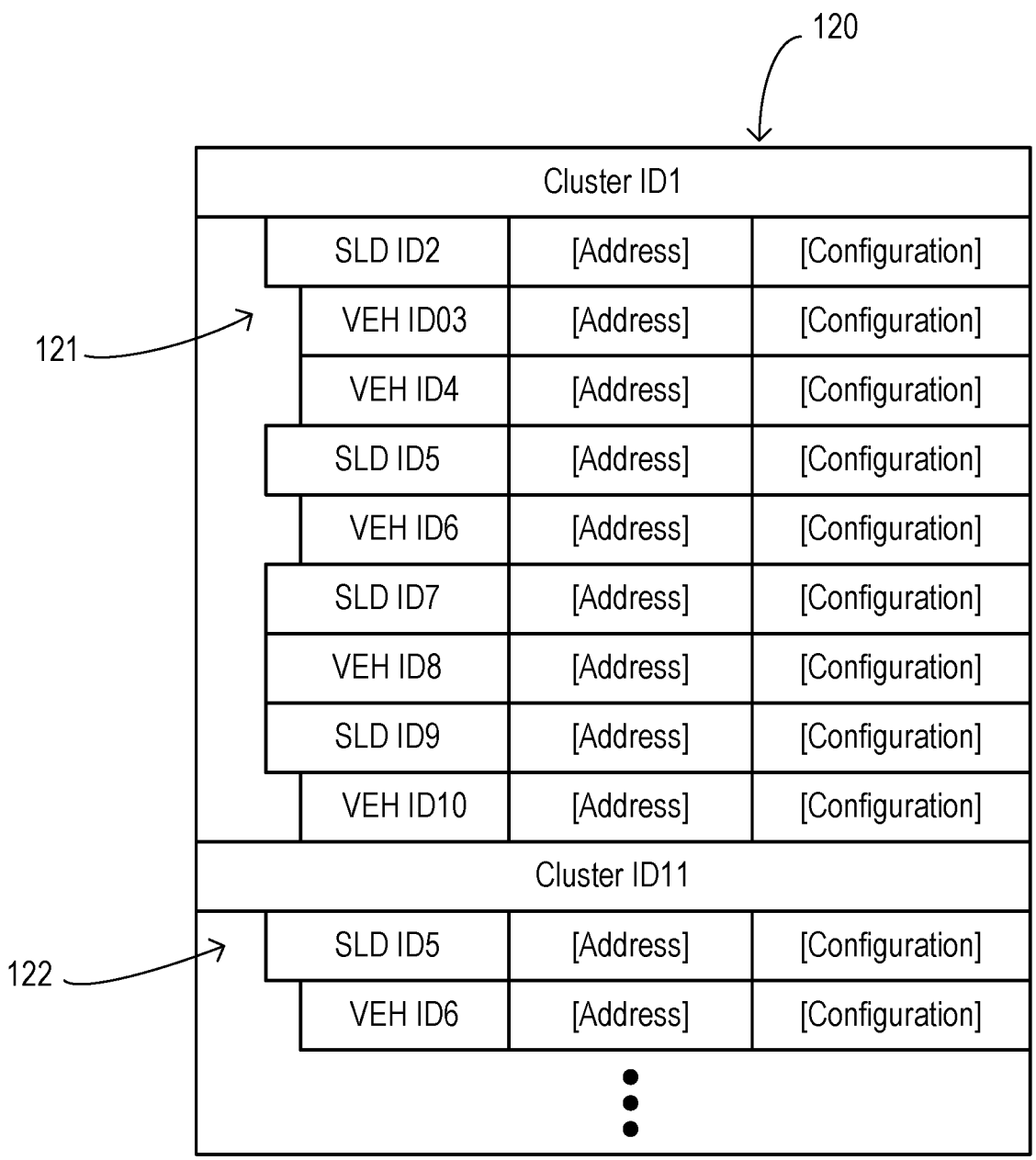
FIG. 8 depicts a cluster directory maintained by a cluster manager.

To setup and manage neighborhood clusters, server 110 may include a service module programmed to authenticate users, create directories of clusters and cluster members, define available interactions and features, provide memory for storing data collected by cluster members, and report alarm conditions to various response centers (e.g., police, fire, or health responders) among other management functions. FIG. 8 shows an example of a cluster directory 120 having memory blocks including a first memory block 121 storing a directory for a Cluster ID1 and a second memory block 122 storing a directory for a second Cluster ID11. For each SLD or vehicle in directory 120, a network address and configuration data may be stored. The configuration data may report the functional capabilities of the cluster devices and/or data that may be needed to access the functional capabilities. Directory 120 may show the relationships between SLD members and vehicle (VEH) members. For example, cluster ID1 includes an SLD ID2, and SLD ID2 may have subordinate vehicles VEH ID3 and VEH ID4. Depending upon the communication capabilities and the desired functions to be performed, SLDs can be cluster members without an associated vehicle (e.g., SLD ID7) and vehicles can be cluster members without an associated SLD (e.g., VEH ID8) provided each has a way to link to server 110 (e.g., using an app or skill executing on a networked device, such as an SLD, smartphone, or vehicle electronic module). In addition to entries for subordinate vehicles, directory 120 may also be expanded to include subentries for other devices that are members of a cluster such as a mobile device or camera installations. In this way, directory 120 enables increased functionality as a cluster grows over time.

Figure 9:
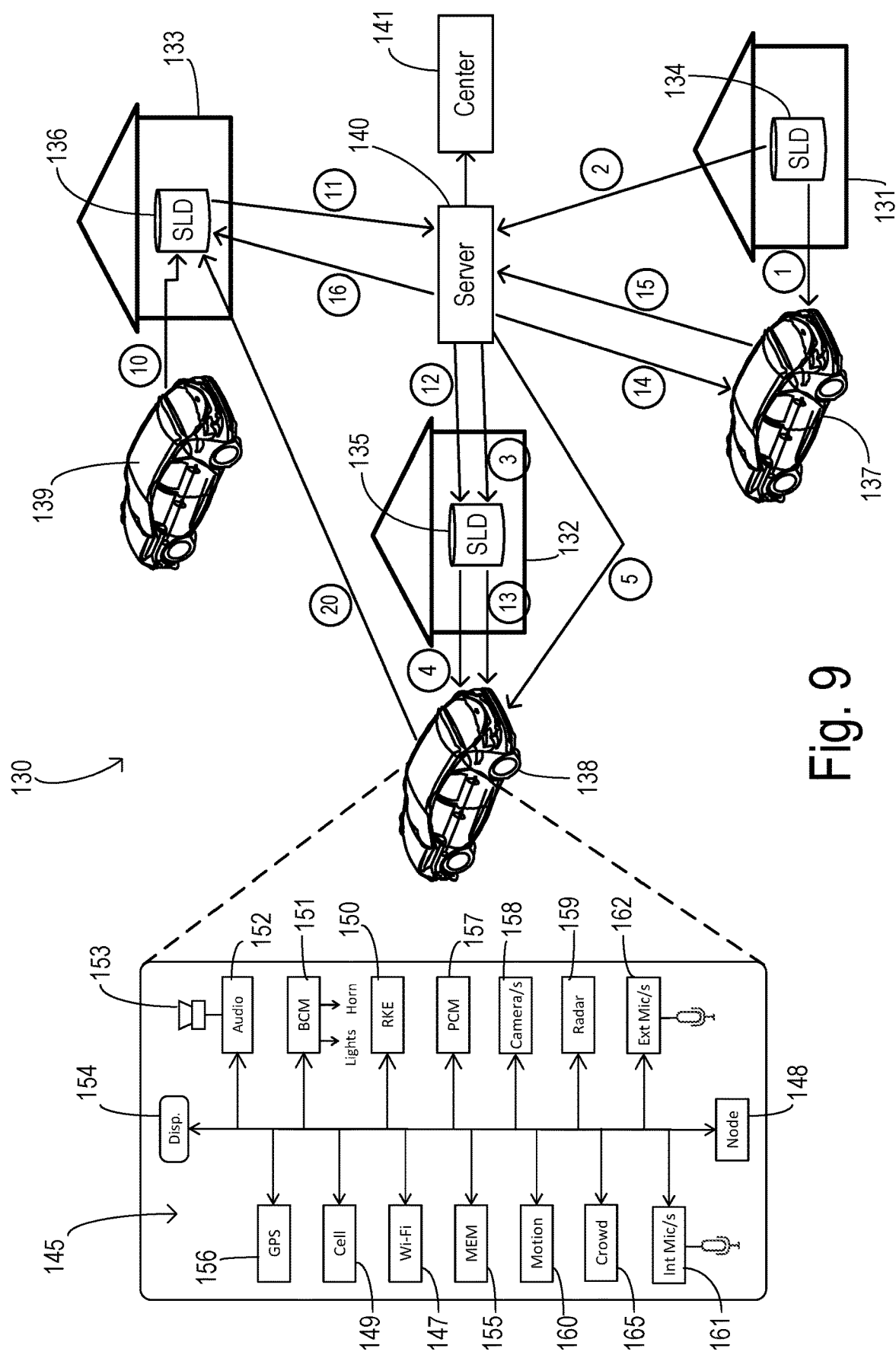
FIG. 9 is a block diagram showing interaction between cluster members.

FIG. 9 demonstrates some of the kinds of interactions that may occur between entities (i.e., SLDs and vehicles) in a configured neighborhood cluster 130. Cluster 130 has cluster members associated with dwellings 131, 132, and 133. Dwelling 131 has an SLD 134 and a vehicle 137 associated with it. Dwelling 132 has an SLD 135 and a vehicle 138 associated with it. Dwelling 133 has an SLD 136 and a vehicle 139 associated with it. SLDs 134-136 and vehicles 137-139 may interact with each other in at least a couple of ways, such as 1) directly with one another due to their close proximity (e.g., as a result of generated alarm sound being detected across dwelling boundaries or as a result of short range wireless communication) and 2) mediated communication through cluster server 140. In connection with some security functions of the cluster, server 140 may communicate with a response center 141 such as medical, fire, or police first responders, security services, or insurance companies.

Portions of an electrical architecture 145 interconnected on a bus 146 are shown for vehicle 138. A Wi-Fi module 147 is connected with bus 31 to provide a communication link to one or more SLDs. A Bluetooth node 148 and a cellular transceiver 149 support additional communication links. A remote keyless entry/security system (RKE) module 150 together with a BCM 151 can generate panic alarms and intrusion alarms by flashing vehicle lights and honking a vehicle horn, for example. The alarms lights and sounds could be detected by one or more SLDs in cluster 130 to trigger a response, or any particular vehicle in cluster 130 could be commanded to initiate an alarm by events detected at other vehicles and any SLD in the cluster. Vehicle 138 further includes an audio system 152 with loudspeaker 153 and a graphical display 154 of a human machine interface (HMI). Vehicle 138 includes cameras 158 capturing video signals that may be recorded in a memory 155 (and further transmitted to server 140 and/or response center 141). A GPS system 156 may provide a geographic location and a time of day to tag the recording.

Vehicle 138 has a PCM 157 to sense temperature data, humidity data, or other environmental variables to support detection of events of interest. Other components for monitoring the vehicle surrounds can include a radar 159, motion sensor 160, internal microphone 161, and external microphone 162. Vehicle 138 includes a crowd-sourcing module 165 which is programmed for the setup and operation as a cluster member. Module 165 may be a standalone module or may be implemented using one or more electronic modules already present in a vehicle, such as a network gateway module (not shown) or cellular transceiver module 149 or BCM 151, for example. Module 165 handles configuring communication links with one or more SLDs and with cluster server 140 (e.g., via its base SLD 135). Module 165 is further programmed to identify its relevant capabilities to the linked SLDs.

Once cluster 130 is sufficiently configured, various crowd-sourcing interactions are supported. For example, when SLD 134 in dwelling 131 detects an alerting event it may send an alert message ① to vehicle 137 to initiate an alarm response. Simultaneously, SLD sends a message ② to server 140 in order to initiate additional responses and/or to inform other cluster members of the alerting event. In response, server 140 sends a message ③ to SLD 135 which relays a message ④ to vehicle 138 to initiate an additional alert response. If so configured, server 140 could alternatively send an alerting message ⑤ directly to vehicle 138.

In a different scenario, vehicle 139 detects some kind of a trigger event and sends an alerting message ⑩ to its associated SLD 136. In addition to taking any appropriate local action, SLD 136 sends a message ⑪ to server 140 in order to initiate a crowd-sourced response to the event or to gather additional information to facilitate analysis of a potential event. Server 140 sends a message ⑫ to SLD 135 as either a source of additional information or as an agent to elicit further responsive actions, including sending a message ⑬ to vehicle 138 to obtain involvement of its resources. If so configured, server 140 can link directly with other local vehicles. For example, a direct message ⑭ is additionally sent to vehicle 137 which can respond with a message ⑮. Thus, server 140 can coordinate the gathering of surveillance and the response to any detected situations.

As described above, a security alarm generated by a vehicle at one dwelling could be detected (i.e., heard) by an SLD at a different dwelling and acted upon by that SLD. Similarly, a vehicle of one user (homeowner of a dwelling with an associated SLD) can be configured to link directly with an SLD of a different user (a different homeowner). For example, vehicle 138 can be configured to communicate with a Wi-Fi access point of dwelling 133 in order to send a message ⑳ to SLD 136.

Figure 10:
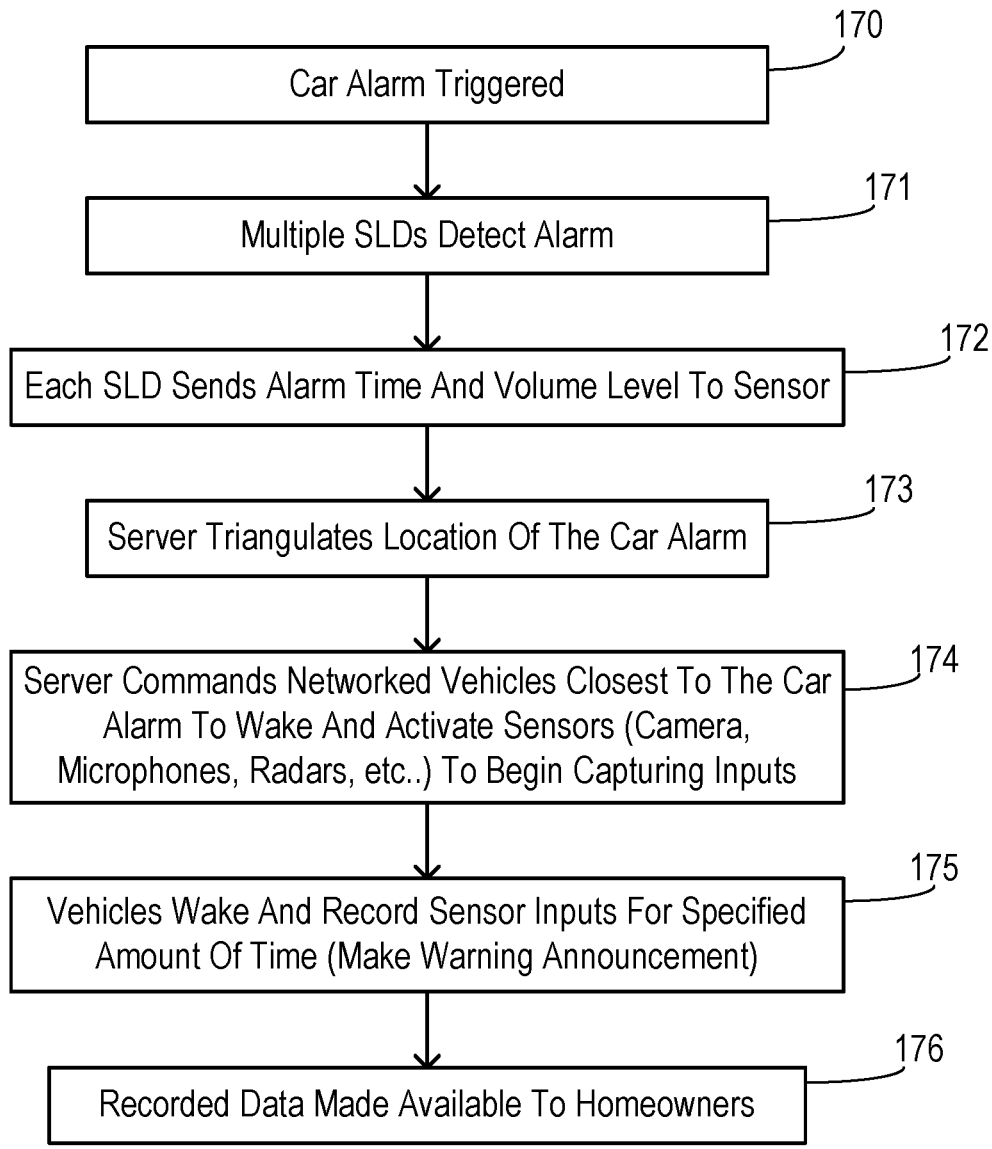
FIG. 10 is a flowchart showing a cluster response to a car alarm.

FIG. 10 shows one embodiment of a method for crowd-sourcing of vehicles and SLDs in a cluster. In step 170, a car alarm is triggered in a vehicle present in a neighborhood for which a cluster has been created. In this instance, the vehicle need not be configured for wireless communication in the cluster. In step 171, multiple SLDs in the cluster detect the car alarm (e.g., by detecting the associated sound). Each SLD that detects the sound sends a message to the cluster server to identify the time of the alarm and the volume level at which the alarm sound was detected. Based on the relative sound levels reported to it and on the known GPS location of the SLD, the server triangulates the location of the car alarm in step 173. In step 174, the server commands networked vehicles in the cluster closest to the triangulated location to wake up and to activate their sensors for monitoring the surroundings. In step 175, the clustered vehicles wake up and start recording sensor data (e.g., camera images, sounds, and radar tracking of objects) for a specified time. To deter undesirable activities, the vehicles may also generate visible or audible warnings or audible warning announcements. In step 176, recorded data can be sent to the server and/or made available to homeowners in the cluster.

Figure 11:
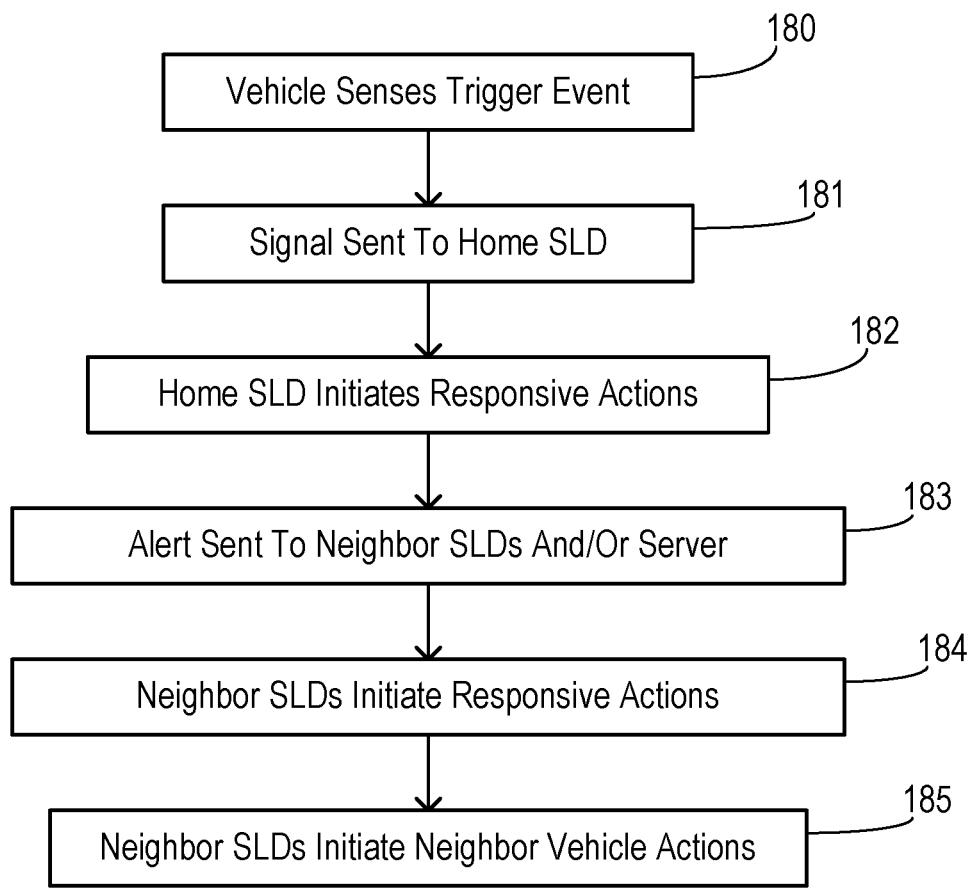
FIG. 11 is a flowchart showing a method for operating a cluster.

FIG. 11 shows another method wherein a vehicle which is performing continuous monitoring for various trigger events senses an event in step 180. An alerting signal or message is sent to its home SLD in step 181. In step 182, the home SLD initiates associated responsive actions (e.g., according to any of the security actions described herein and others). In order to obtain crowd-sourced assistance, an alert message or messages are sent by the home SLD to neighboring SLDs in the cluster and/or to the cluster server in step 183. In step 184, neighbor SLDs initiate their own responsive actions (e.g., providing a notification to dwelling occupants of the event). In step 185, the neighbor SLDs may also transmit messages to their respective vehicles in initiate vehicle responses in the neighbor vehicles.

What is claimed is:

1. A smart listening device comprising:
   an audio detector responsive to speech and ambient sounds to provide digital audio signals;
   a distributed controller coupled to the audio detector to execute responsive actions in response to the digital audio signals;
   a communications circuit establishing a first communication link with a backend; and
   a database identifying at least one user transport vehicle and at least one responsive action corresponding to the user vehicle;
   wherein the distributed controller has a monitoring mode for detecting preconfigured alerting events and has an alert/response mode for executing responsive actions associated with the detected alerting events;
   wherein the communications circuit establishes a second communication link with the user vehicle when an executed responsive action is associated with a detected alerting event corresponding to the user vehicle in order to initiate the responsive action;
   wherein the database further identifies a cluster of other smart listening devices in a plurality of dwellings within a neighborhood region, and wherein the database further identifies neighboring vehicles associated with the other smart listening devices;
   wherein the responsive actions include at least one message to one of the other smart listening devices or neighboring vehicles to initiate the responsive action.

2. The device of claim 1 wherein the database is at least partially contained in a cluster server for providing a directory of the other smart listening devices and neighboring vehicles.

3. An alerting system comprising:
   a cluster server configured to provide a cluster directory and to coordinate interactions between cluster members identified in the cluster directory;
   a transport vehicle including an alert accessory, a wireless transceiver, and a crowd-sourcing controller for processing crowd-sourcing messages, wherein the crowd-sourcing controller is configured to communicate with the cluster server for registering in the cluster directory as a cluster member of a predetermined cluster; and
   a smart listening device located remotely from the vehicle comprising:
      an audio detector responsive to speech and ambient sounds to provide digital audio signals;
      a distributed controller coupled to the audio detector to execute responsive actions in response to the digital audio signals; and
      a communications circuit establishing a first communication link with a backend;
      wherein the smart listening device is configured to communicate with the cluster server for registering in the cluster directory as one of the cluster members of the predetermined cluster;
      wherein the distributed controller has a monitoring mode for detecting preconfigured alerting events and has an alert/response mode for executing responsive actions associated with the detected alerting events; and
   wherein other smart listening devices in a plurality of dwellings within a neighborhood region are registered in the cluster directory as a cluster member of the predetermined cluster, and wherein the responsive actions include the cluster members exchanging messages corresponding to the detected alerting event.

4. The alerting system of claim 3 wherein neighboring vehicles associated with the other smart listening devices are registered in the cluster directory as cluster members of the predetermined cluster, and wherein the responsive actions include the crowd-sourcing controller exchanging a message with one of the other smart listening devices.

5. A method of neighborhood monitoring comprising:
   configuring a cluster server within a public network to maintain a cluster directory identifying cluster members including a neighborhood of smart listening devices and user vehicles, wherein the neighborhood is associated with a cluster of dwellings;
   monitoring surroundings of the smart listening devices and the user vehicles using sensors in the smart listening devices and the user vehicles;
   detecting an alerting event with one of the sensors;
   a corresponding one of the smart listening devices and the user vehicles that detected the alerting event initiating a message to another cluster member based on the cluster directory; and
   the cluster member receiving the message initiating a responsive action to the alerting event.

6. The method of claim 5 wherein the cluster member receiving the message is a user vehicle, and wherein the responsive action includes generating a visible or audible alarm signal.

7. The method of claim 5 wherein the cluster member receiving the message is a user vehicle, and wherein the responsive action includes activating sensors for monitoring the surroundings of the user vehicle and recording outputs of the sensors.

8. The method of claim 5 wherein the cluster member receiving the message is a smart listening device, and wherein the responsive action includes a user notification.

9. The method of claim 5 wherein the message is transmitted directly between cluster members.

10. The method of claim 5 wherein the message is transmitted between cluster members through the cluster server.

11. The method of claim 5 further comprising sending an alert message from the cluster server to a response center according to the alerting event.

12. The method of claim 5 wherein the cluster member receiving the message is a user vehicle, wherein the responsive action includes activating sensors for monitoring the surroundings of the user vehicle and recording outputs of the sensors, and wherein the method further comprises:
sending the recorded outputs to other cluster members.

13. The method of claim 5 wherein the cluster member receiving the message is a user vehicle, wherein the responsive action includes activating sensors for monitoring the surroundings of the user vehicle and recording outputs of the sensors, and wherein the method further comprises:
sending the recorded outputs to the cluster server and to a response center.

* * * * *